Feb. 22, 1927.
P. B. CAMP
BRAKE
Filed Feb. 1, 1926
1,618,810
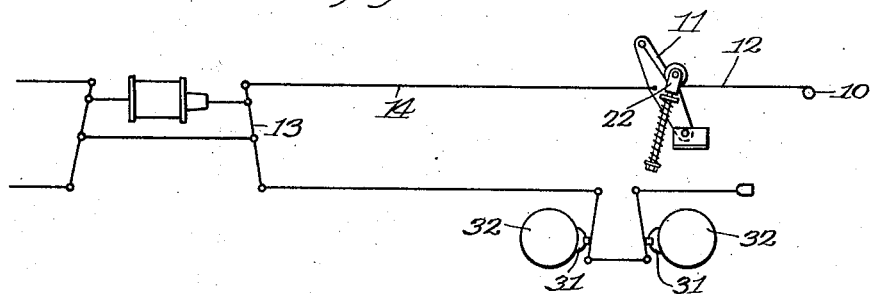
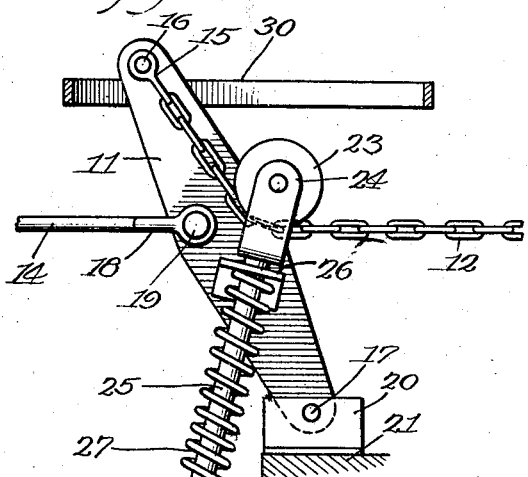
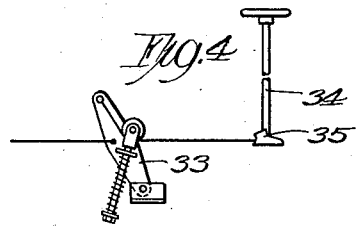
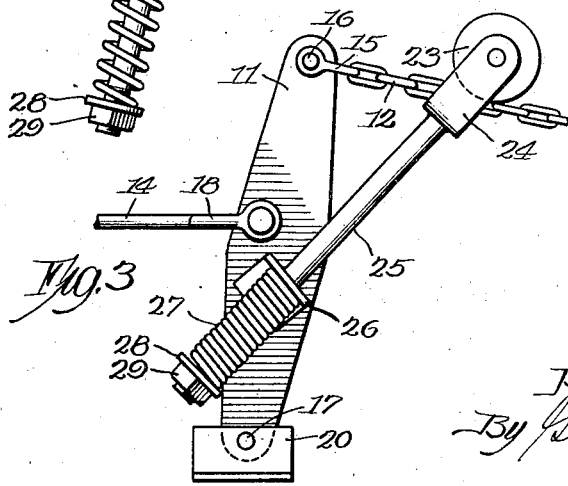
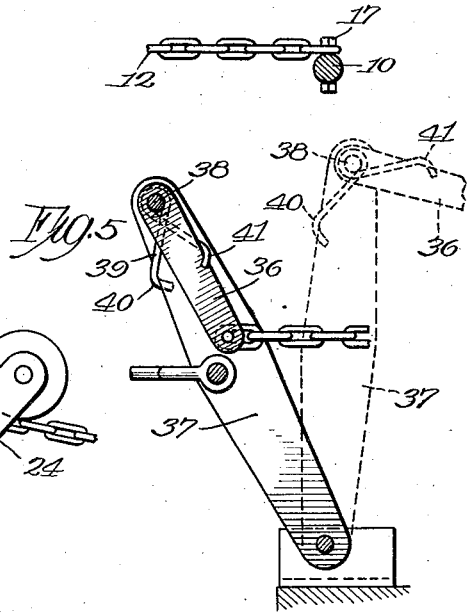
Inventor:
Percy B. Camp Patented Feb. 22, 1927.

1,618,810

UNITED STATES PATENT OFFICE.

PERCY B. CAMP, OF MAYWOOD, ILLINOIS, ASSIGNOR TO UNIVERSAL DRAFT GEAR ATTACHMENT CO., OF CHICAGO, ILLINOIS, A CORPORATION OF ILLINOIS.

BRAKE.

Application filed February 1, 1926. Serial No. 85,089.

This invention relates to hand brake mechanism for railway cars and has for its principal objects to permit a quick take-up of slack followed by a powerful application of the brakes. Further and more specific objects of the invention will appear as the disclosure proceeds and the description is read in connection with the accompanying drawings, in which Fig. 1 is a diagrammatic view illustrating the preferred form of the invention connected with a conventional form of foundation brake gear;

Fig. 2 is an enlarged plan view of the multiplying lever and the guide for changing the leverage of the winding mechanism;

Figure 3 is a view similar to Fig. 2 showing the parts in the approximate position they assume when the brakes are applied;

Fig. 4 is a view similar to Fig. 1, illustrating an alternative arrangement, and Fig. 5 is a view similar to Fig. 2 illustrating a modified construction.

In the diagram shown in Fig. 1, 10 indicates a suitable winding mechanism; 11 a multiplying lever having a long arm connected with the winding mechanism by a flexible element 12 and a short arm connected with the foundation brake gear 13 by a connector 14. The foundation brake gear illustrated is of conventional form being shown merely to illustrate the application of the invention, and need not be described in detail, for any form of foundation brake gear may be used.

In Fig. 2, the flexible element 12 is shown as a brake chain fastened to the lever 11 by shackle 15 at the end 16 remote from the lever fulcrum 17, and connected with a brake staff 10. The connector 14 is shown as a brake rod having a jaw 18 connected with the lever 11 at the point 19, between the point 16 and the fulcrum 17. The lever is thus divided into a long arm represented by the distance between the points 16 and 17, and a short arm represented by the distance between the points 19 and 17, and these arms are connected with the winding mechanism and the foundation brake gears respectively.

The fulcrum may be made as circumstances require and is here indicated by a bracket 20 secured to the car frame at 21.

The chain 12 is biased, or deflected to reduce the effective length of the long arm lever by a guide generally indicated in Fig. 1, at 22, and composed of a grooved sheave 23 rotatably mounted in a jaw 24, having an elongated shank 25, mounted to reciprocate in a guide 26 under the control of a spring 27 interposed between the guide and a head 28 secured to the shank 25 by a nut 29. The free end of the lever 11 is supported by a bracket 30 secured to the car frame in any suitable manner.

When it is desired to apply the brakes, the winding mechanism illustrated by the brake staff is rotated in a clockwise direction in Fig. 2, winding the chain 12 upon it. Due to the biased position of the chain it acts upon the lever 11, as though connected with it at an intermediate point, and thus gives that lever a relatively rapid rotation in a clockwise direction, towards the position shown in Fig. 3, bringing the brake shoes 31 quickly into contact with the wheels 32 with very little rotation of the winding mechanism. Further operation of the winding mechanism meets with increased resistance and chain 12 tends to straighten or approach a direct line between the points 16 and 36, thus lengthening the effectual lever arm and to a corresponding extent increasing the power transmitted to the brake rod 14, and hence to the foundation brake gear.

By varying the proportions and the relative positions of the parts, the speed and amount of the take up and the power of the brake application may be made to suit the requirements of the various conditions.

The guide is preferably mounted upon the lever 11 for that arrangement results in a compact organization that may be manufactured and supplied to car owners for application by them to either new or old cars.

Fig. 4 illustrates an arrangement in which the lever 33, corresponding to the lever 11, is pivoted on an axis transverse to the axis of the winding mechanism represented by the brake shaft 34. In that event it is advantageous to equip the shaft with a spiral drum 35 such as described in Patent No. 1,545,992 granted to Wrigley, July 14, 1925, which constrains the chain to wind upwardly in Fig. 4 and thus keeps it in position to get the best results from the lever 33 in its various positions.

In Fig. 5 the biasing guide is shown in the form of a link 36 pivoted to the free end of the lever 37 at 38 and normally held substantially parallel to the lever by a spring 39, having one end 40 engaged with the lever, and the opposite end 41 engaged with the link. The operation of this form is substantially the same as that shown in Figs. 1 and 2 and the parts assume the dotted line positions as the brakes are applied.

These illustrations will be sufficient to enable those skilled in the art to embody the invention in suitable forms of simple construction that will effectively accomplish the quick take-up followed by powerful application.

I claim as my invention:

1. In a hand brake mechanism for cars having a frame and a foundation brake gear, the combination of a winding mechanism, a lever fulcrumed on the frame and having a short arm and a long arm, a connection between the short arm and the foundation brake gear, a flexible connection between the long arm and the winding mechanism and yielding means to normally bias the flexible connection from a straight line.

2. In a hand brake mechanism for cars having a frame and a foundation brake gear, the combination of a winding mechanism, a lever fulcrumed on the frame and having a short arm and a long arm, a connection between the short arm and the foundation brake gear, a flexible connection between the long arm and the winding mechanism and means tending to bias the flexible connection from a straight line and decrease the effective length of the long arm of the lever comprising a guide for the flexible connector and yielding means for supporting the guide.

3. In a hand brake mechanism for cars having a frame and a foundation brake gear, the combination of a winding mechanism, a lever fulcrumed on the frame and having a short arm and a long arm, a connection between the short arm and the foundation brake gear, a flexible connection between the long arm and the winding mechanism and means tending to bias the flexible connection from a straight line and decrease the effective length of the long arm of the lever comprising a sheave cooperating with the connection, a jaw carrying the sheave, and a spring resisting movement of the sheave.

4. In a hand brake mechanism for cars having a frame and a foundation brake gear, the combination of a winding mechanism, a lever fulcrumed on the frame and having a short arm and a long arm, a connection between the short arm and the foundation brake gear, a flexible connection between the long arm and the winding mechanism and means tending to bias the flexible connection from a straight line and decrease the effective length of the long arm of the lever comprising an eye, a jaw having a shank in the eye, a head on the shank, a spring between the eye and head and a sheave in the jaw cooperating with the flexible connection.

5. In a hand brake mechanism for cars having a frame and a foundation brake gear, the combination of a winding mechanism, a lever fulcrumed on the frame and having a short arm and a long arm, a connection between the short arm and the foundation brake gear, a flexible connection between the long arm and the winding mechanism, and means to bias the flexible connection towards the fulcrum of the lever during the initial movement thereof and permitting the flexible connection to straighten as the movement continues.

6. In a hand brake mechanism for cars having a frame and a foundation brake gear, the combination of a winding mechanism, a lever fulcrumed on the frame and having a short arm and a long arm, a connection between the short arm and the foundation brake gear, a flexible connection between the long arm and the winding mechanism, and a guide for the flexible connection between the ends of the long arm and yielding means for resisting movement of the guide.

7. A commercial unit for hand brake mechanisms comprising a lever having a short arm adapted to be connected with a foundation brake gear and a long arm adapted to receive power through a flexible connection, and means associated with the lever to yieldingly bias the flexible connection.

8. In a mechanism of the class described, a commercial unit comprising a lever having a long arm and a short arm, a chain attached to one end of the long arm, a chain guide adapted to bias the chain towards the opposite end of the lever from that to which it is connected and comprising a sheave engaging the chain, a jaw for the sheave having a shank, a guide for the shank, a head on the shank opposite to the sheave and a spring between the head and the guide for the shank.

9. A commercial unit for hand brake mechanisms comprising a lever having a short arm adapted to be connected with a foundation brake gear and a long arm adapted to receive power through a flexible connection, and a guide yieldingly mounted between the ends of the long arm to bias the flexible connection.

In testimony whereof I affix my signature.

PERCY B. CAMP.